United States Patent
Chen et al.

(10) Patent No.: US 7,160,018 B2
(45) Date of Patent: Jan. 9, 2007

(54) LIGHT GUIDE PLATE WITH NANO-PARTICLE LAYER AND BACK LIGHT SYSTEM WITH SAME

(75) Inventors: Ga-Lane Chen, Fremont, CA (US); Charles Leu, Fremont, CA (US)

(73) Assignee: Hon Hai Precision Industry Co., Ltd. (TW)

( * ) Notice: Subject to any disclaimer, the term of this patent is extended or adjusted under 35 U.S.C. 154(b) by 193 days.

(21) Appl. No.: 10/951,846

(22) Filed: Sep. 27, 2004

(65) Prior Publication Data
US 2005/0047112 A1    Mar. 3, 2005

(30) Foreign Application Priority Data
Nov. 4, 2003    (TW) .............................. 92130743 A

(51) Int. Cl.
*F21V 7/04* (2006.01)

(52) U.S. Cl. ................... 362/620; 362/26; 362/617; 349/65; 385/901

(58) Field of Classification Search .............. 362/555, 362/617–620, 26; 385/129, 901, 146; 349/65
See application file for complete search history.

(56) References Cited

U.S. PATENT DOCUMENTS

| | | | |
|---|---|---|---|
| 5,779,337 A | 7/1998 | Saito et al. | 362/31 |
| 6,231,200 B1 | 5/2001 | Shinohara et al. | 362/31 |
| 6,356,391 B1 | 3/2002 | Gardiner et al. | 359/628 |
| 6,844,950 B1* | 1/2005 | Ja Chisholm et al. | 359/456 |
| 2004/0228141 A1* | 11/2004 | Hay et al. | 362/555 |
| 2005/0059766 A1* | 3/2005 | Jones et al. | 524/431 |

* cited by examiner

*Primary Examiner*—Stephen F Husar
(74) *Attorney, Agent, or Firm*—Morris Manning & Martin LLP; Tim Tingkang Xia, Esq.

(57) ABSTRACT

A back light system (2) includes a light guide plate (50). The light guide plate includes an array of prisms (55) formed thereon, and a nano-particle layer (80) formed on the prisms for diffusing light beams propagating therethrough. The nano-particle layer contains a mass of transparent nano-particles with diameters preferably in the range from 30~100 nm. A material of the particles may be $TiO_2$ (titanium oxide), $SiO_2$ (silicon dioxide), or $Al_2O_3$ (aluminum oxide). Each light beam passing through the nano-particle layer is scattered, and most of the scattering occurs over a limited range of angles. The scattered light beams exit the nano-particle layer mostly over the limited range of angles, with a medial direction of propagation in the range of angles being substantially parallel to a viewing direction. The back light system can yield high brightness and uniform luminescence, and is relatively simple in construction and inexpensive.

16 Claims, 2 Drawing Sheets

LIGHT GUIDE PLATE WITH NANO-PARTICLE LAYER AND BACK LIGHT SYSTEM WITH SAME

BACKGROUND OF THE INVENTION

1. Field of the Invention

The invention generally relates to a light guide plate and an associated back light system used for a liquid crystal display (LCD) device.

2. Prior Art

In general, an LCD has the advantages of thinness, light weight and low power consumption. For these reasons, LCDs are widely used in various types of electronic equipment, from pocket calculators to large-scale office automation equipment.

Conventionally, an LCD includes a liquid crystal panel and a back light system for providing illumination. The back light system generally includes a light guide plate, a light source, a reflective plate, a diffusing sheet, and a prism sheet. The light guide plate includes a light incident surface, a light-emitting surface, and a bottom surface opposite to the light-emitting surface. The diffusing sheet and prism sheet are located one on top of the other, on the light-emitting surface. The light source is arranged adjacent to the light incident surface. The reflective plate is arranged under the bottom surface. The light guide plate is commonly wedge-shaped or has a regular oblong configuration. The light guide plate receives light beams from the light source such as a cold cathode fluorescent lamp (CCFL), and outputs the light beams uniformly from a substantially planar surface of the light guide plate. Then, the output light beams are coupled to the liquid crystal panel.

The performance of a display device is often judged by its brightness and uniformity of luminescence. The alternatives for increasing a display's brightness include using more light sources, and/or using brighter light sources. However, additional light sources and/or brighter light sources consume more energy. For portable devices, this decreases a battery's lifetime. Also, adding light sources to the LCD may increase production costs and can lead to reduced reliability of the device.

The brightness of the display can also be enhanced by utilizing the light beams within the LCD more efficiently. That is, by directing more light beams within a predetermined range of viewing angles, and by directing the strongest light beams along a preferred viewing axis within the range of viewing angles. A number of mechanisms have been employed within LCDs to improve the display efficiency in this way. For example, brightness enhancing films (prism films) having prismatic structures are frequently used to direct light beams that would otherwise not be viewed to be within the range of viewing angles. A typical flat back light system may use several different films to provide an overall bright, high contrast display with substantially uniform luminescence within the range of viewing angles. Such kind of conventional back light system is found in U.S. Pat. No. 6,356,391, issued on 2002 Mar. 12.

Referring to FIG. 4, a back light system 10 of the patent includes a light guide plate 16, a light source 12, a reflective plate 24, two prism films 26, 32, and a reflective polarizer 34. Referring to FIG. 5, the prism film 26 has a bottom surface 28, which has an array of prisms defined by a plurality of first prisms 38, second prisms 40 and third prisms 42. Configurations of the three prisms 38, 40, 42 are not the same. Light beams from below impinge on the bottom surface 28 at various inclined angles, traverse through the prism film 26, and emit from a top surface 30 of the prism film 26. The light beams are directed by the prisms 38, 40, 42 to emit at angles substantially parallel to a viewing direction of a liquid crystal panel (not shown). The back light system 10 is complicated, unduly thick, and costly.

Other alternatives for directing light beams along a viewing axis of an LCD have been proposed, such as in U.S. Pat. No. 5,779,337 and U.S. Pat. No. 6,231,200, which issued on 1998 Jul. 14 and 2001 May 15 respectively. The main thrust of the two patents is directly forming prisms on a light-emitting surface of a light guide plate, so as to avoid or decrease the need for separate prism films.

In addition, diffusers are commonly disposed on a light guide plate, in order to mask bright spots in the output of the light guide plate and achieve substantially uniform luminescence. However, most diffusers scatter light beams out from the range of viewing angles, and therefore reduce the brightness within the range of viewing angles. Furthermore, a diffuser generally comprises a mass of diffusing particles therein for scattering light beams passing therethrough. The diffusing particles also partly absorb light beams, resulting in decreased luminescence.

SUMMARY OF THE INVENTION

An object of the present invention is to provide a light guide plate yielding high brightness and uniform luminescence.

Another object of the present invention is to provide a back light system yielding high brightness and uniform luminescence, and being relatively simple in construction and inexpensive.

A light guide plate in accordance with the present invention comprises a light-emitting surface having an array of prisms provided thereon, and a nano-particle layer formed on the light-emitting surface for diffusing light beams propagating therethrough. The nano-particle layer contains a mass of transparent nano-particles with diameters preferably in the range from 30~100 nm. A material of the particles may be $TiO_2$ (titanium oxide), $SiO_2$ (silicon dioxide), or $Al_2O_3$ (aluminum oxide). Each light beam passing through the nano-particle layer is scattered, and most of the scattering occurs over a limited range of angles. The scattered light beams exit the nano-particle layer mostly over the limited range of angles, with a medial direction of propagation in the range of angles being substantially parallel to a viewing direction.

A back light system in accordance with the present invention comprises a light guide plate. The light guide plate comprises a light-emitting surface, an opposite bottom surface, and a light incident surface between the light-emitting surface and the bottom surface. An array of prisms is provided on the light guide plate, and a nano-particle layer is formed on the array of prisms for diffusing light beams propagating therethrough. The nano-particle layer has the same characteristics as the nano-particle layer described above. The back light system can yield high brightness and uniform luminescence, and is relatively simple in construction and inexpensive.

Other objects, advantages, and novel features of the present invention will become more apparent from the following detailed description when taken in conjunction with the accompanying drawings, in which:

DESCRIPTION OF THE PREFERRED EMBODIMENTS

Figure 1:
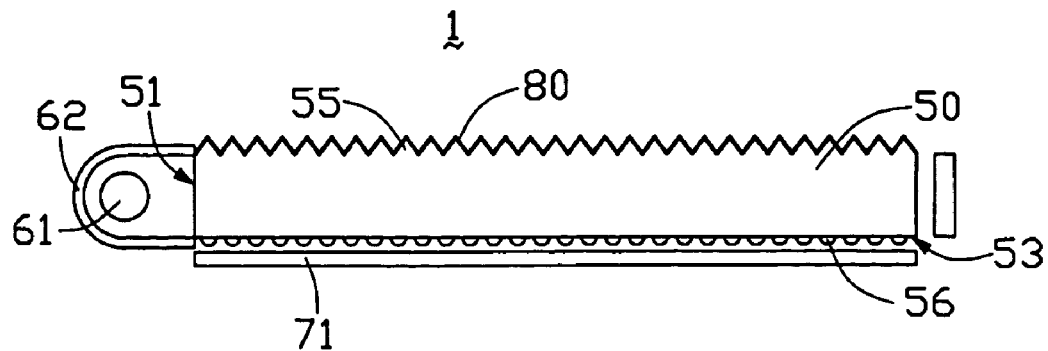
FIG. 1 is a schematic, side elevation of a back light system according to a first embodiment of the present invention.

Referring to FIG. 1, a back light system 1 according to a preferred embodiment of the present invention includes a plate-like light guide member 50, a tubular light source 61 and a reflective plate 71. The light source 61 is arranged adjacent to a light incident surface 51 of the light guide plate 50. A U-shaped light source cover 62 surrounds the light source 61 on three sides, so as to reflect light beams emitted by the light source 61 to the light guide plate 50. The reflective plate 71 is located under a bottom surface 53 of the light guide plate 50.

The light guide plate 50 has an array of prisms 55 formed on a light-emitting surface (not labeled) that is opposite to the bottom surface 53. The light incident surface 51 adjoins both the array of prisms 55 and the bottom surface 53. The prisms 55 are contiguously arranged parallel to each other, such that they are also parallel to the light source 61.

A plurality of reflective dots 56 is formed on the bottom surface 53 of the light guide plate 50. The dots 56 have different diameters in the range from 1 to 3 micrometers. The dots 56 cooperatively function as a diffusing sheet, to diffuse light beams impinging thereon and reflect the light beams back into the light guide plate 50.

A nano-particle layer 80 is coated on the array of prisms 55. The nano-particle layer 80 contains a mass of transparent nano-particles with diameters in the range from 20~400 nm, and preferably in the range from 30~100 nm. A material of the particles may be $TiO_2$ (titanium oxide), $SiO_2$ (silicon dioxide), or $Al_2O_3$ (aluminum oxide). Alternatively, the particles may be a mixture of $TiO_2$ particles and $Al_2O_3$ particles, or a mixture of $TiO_2$ particles and $SiO_2$ particles.

The nano-particle layer 80 can be formed on the array of prisms 55 by, for example, Chemical Vapor Deposition (CVD), plasma deposition, reactive sputtering, or RF (radio frequency) sputtering.

Figure 2:
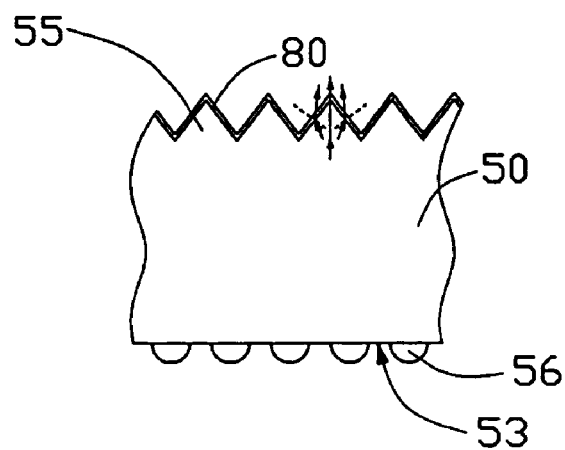
FIG. 2 is an enlarged view of part of a light guide plate of the back light system of FIG. 1.

Referring to FIG. 2, in operation, light beams emitted by the light source 61 pass through the light incident surface 51 and enter the light guide plate 50. Part of the light beams directly emit out from the light-emitting surface. Other light beams transmit to the bottom surface 53. Part of these latter light beams are diffused by the dots 56 of the light guide plate 50 and reflected by the reflective plate 71 back into the light guide plate 50.

Light beams propagating in different directions pass through the array of prisms 55, and emit in a substantially same direction that is parallel to a viewing direction. In addition, based on the theory of nano-optics, when each light beam pass through the nano-particle layer 80, it is scattered, and most of the scattering occurs over a limited range of angles. The scattered light beams exit the nano-particle layer 80 mostly over the limited range of angles, with a medial direction of propagation in the range of angles being substantially parallel to the viewing direction. Therefore, the back light system 1 can provide both high brightness and uniform luminescence without the need for an additional prism film or diffuser.

Based on the theory of nano-optics, the particles in the nano-particle layer 80 are small enough to not reflect light beams impinging thereon. Furthermore, the particles do not absorb light beams impinging thereon. In other words, light beams fully transmit through the particles. Thus, more light beams can emit from the light guide plate 50 and be received by a viewer. The particles enable efficient utilization of the light source 61.

Figure 3:
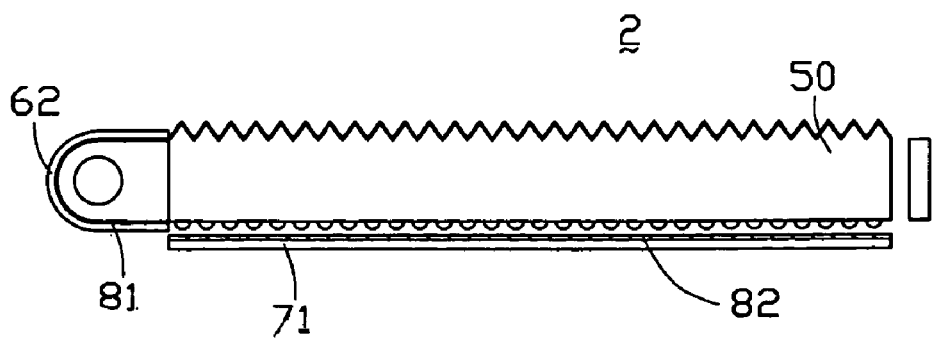
FIG. 3 is a schematic, side elevation of a back light system according to a second embodiment of the present invention.
Figure 4:
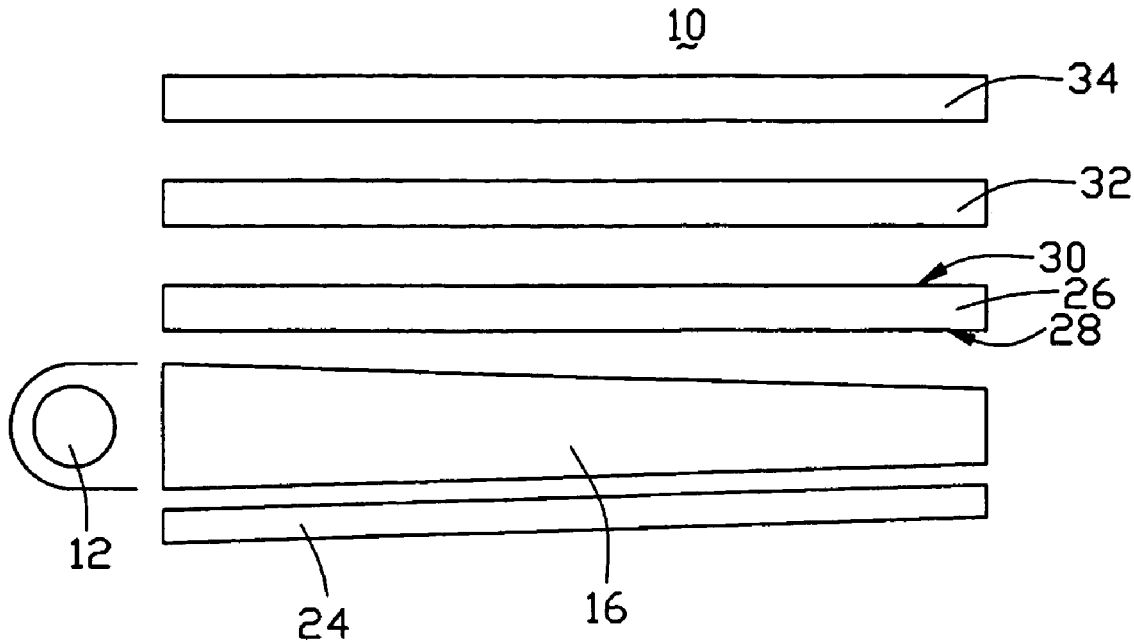
FIG. 4 is a schematic, exploded side elevation of a conventional back light system.
Figure 5:
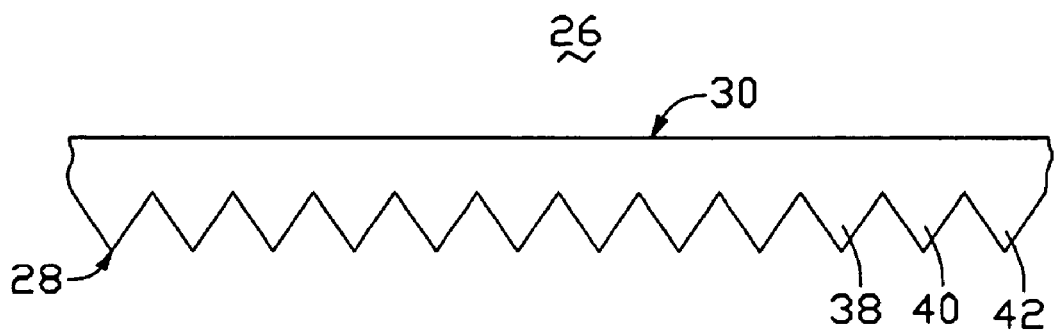
FIG. 5 is an enlarged view of part of a prism film of the back light system of FIG. 4.

Referring to FIG. 3, a back light system 2 according to the second embodiment of the present invention has a structure similar to that of the back light system 1. The back light system 2 has a second nano-particle layer 81 coated on an inner surface of the light source cover 62, for scattering light beams. Furthermore, a third nano-particle layer 82 is coated on a surface of the reflective plate 71 opposing the light guide plate 50, also for scattering light beams.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guide plate comprising:
    a light-emitting surface having an array of prisms provided thereon; and
    a nano-particle layer formed on the light-emitting surface, for diffusing light beams propagating therethrough.

2. The light guide plate as claimed in claim 1, wherein the nano-particle layer comprises particles of $TiO_2$ (titanium oxide), $SiO_2$ (silicon dioxide), or $Al_2O_3$ (aluminum oxide).

3. The light guide plate as claimed in claim 1, wherein the nano-particle layer comprises a mixture of $TiO_2$ (titanium oxide) particles and $Al_2O_3$ (aluminum oxide) particles.

4. The light guide plate as claimed in claim 1, wherein the nano-particle layer comprises a mixture of $TiO_2$ (titanium oxide) particles and $SiO_2$ (silicon dioxide) particles.

5. The light guide plate as claimed in claim 1, wherein diameters of nano-particles in the nano-particle layer are in the range from 20~400 nm.

6. A back light system comprising:
    a light guide plate having a light-emitting surface, an opposite bottom surface, and a light incident surface between the light-emitting surface and the bottom surface;
    an array of prisms provided on the light guide plate; and
    a nano-particle layer formed on the array of prisms, for diffusing light beams propagating therethrough.

7. The back light system as claimed in claim 6, wherein the nano-particle layer comprises particles of $TiO_2$ (titanium oxide), $SiO_2$ (silicon dioxide), or $Al_2O_3$ (aluminum oxide).

8. The back light system as claimed in claim 6, wherein the nano-particle layer comprises a mixture of $TiO_2$ (titanium oxide) particles and $Al_2O_3$ (aluminum oxide) particles.

9. The back light system as claimed in claim 6, wherein the nano-particle layer comprises a mixture of $TiO_2$ (titanium oxide) particles and $SiO_2$ (silicon dioxide) particles.

10. The back light system as claimed in claim 6, wherein diameters of nano-particles in the nano-particle layer are in the range from 20~400 nm.

11. The back light system as claimed in claim 6, further comprising a light source arranged adjacent to the light incident surface of the light guide plate, and a light source cover partly surrounding the light source so as to reflect light beams emitted by the light source to the light incident surface.

12. The back light system as claimed in claim 11, wherein a nano-particle layer is formed on an inner surface of the light source cover.

13. The back light system as claimed in claim 6, further comprising a reflective plate arranged under the light guide plate.

14. The back light system as claimed in claim 13, wherein a nano-particle layer is formed on a surface of the reflective plate that opposes the light guide plate.

15. A back light system comprising:
- a light source;
- a light guide member adjacent to said light source, and light from said light source passing through said light guide member along a pathway therein; and
- a nano-particle layer interferingly located in said pathway of said light for diffusing said light.

16. The back light system as claimed in claim 15, wherein said nano-particle layer is formed on an array of prisms integrally defined on a surface of said light guide member.

* * * * *